United States Patent
He

(10) Patent No.: US 11,684,208 B2
(45) Date of Patent: Jun. 27, 2023

(54) SPLIT-TYPE COOKING APPLIANCE AND CONTROL METHOD THEREOF

(71) Applicant: Foshan Shunde Midea Electrical Heating Appliances Manufacturing Co., Ltd., Foshan (CN)

(72) Inventor: Yidong He, Foshan (CN)

(73) Assignee: FOSHAN SHUNDE MIDEA ELECTRICAL HEATING APPLIANCES MANUFACTURING CO., LTD., Foshan (CN)

( * ) Notice: Subject to any disclaimer, the term of this patent is extended or adjusted under 35 U.S.C. 154(b) by 252 days.

(21) Appl. No.: 16/854,871

(22) Filed: Apr. 21, 2020

(65) Prior Publication Data

US 2020/0245810 A1      Aug. 6, 2020

Related U.S. Application Data

(63) Continuation of application No. PCT/CN2017/011188, filed on Nov. 20, 2017.

(30) Foreign Application Priority Data

Oct. 24, 2017   (CN) .......................... 201711003976.4

(51) Int. Cl.
   *A47J 36/32*       (2006.01)
   *A47J 27/00*       (2006.01)
   (Continued)

(52) U.S. Cl.
   CPC ............. *A47J 36/32* (2013.01); *A47J 27/004* (2013.01); *A47J 27/12* (2013.01); *A47J 36/2483* (2013.01)

(58) Field of Classification Search
   CPC .......... A47J 27/004; A47J 36/32; A47J 36/24; A47J 27/12; A47J 36/2483; A47J 27/00; H05B 6/062
   See application file for complete search history.

(56) References Cited

U.S. PATENT DOCUMENTS

2010/0147832 A1   6/2010  Barker, III et al.
2013/0320000 A1  12/2013  Shan et al.
           (Continued)

FOREIGN PATENT DOCUMENTS

CN     201701051 U    1/2011
CN     102281801 A   12/2011
           (Continued)

OTHER PUBLICATIONS

Foshan Shunde Midea Electrical Heating Appliances Manufacturing Co. Ltd., Extended European Search Report, EP17929552.2, dated Oct. 29, 2020, 5 pgs.

(Continued)

*Primary Examiner* — Dana Ross
*Assistant Examiner* — Kuangyue Chen
(74) *Attorney, Agent, or Firm* — Morgan, Lewis & Bochius LLP

(57) ABSTRACT

Disclosed are a split-type cooking appliance and a control method therefor. The control method includes acquiring state information of an identification device after a base is powered on; if the state information is a first state, forbidding the base from operating in an induction cooker operation mode and allowing the base to operate in an electric cooker operation mode; if the state information of the identification device is a second state, determining whether a wireless transmission coil circuit detects a feedback signal; if so, forbidding the base from operating in the induction cooker operation mode and allowing the base to operate in the electric cooker operation mode; and if not, allowing the base to operate in the induction cooker operation mode, and forbidding the base from operating in the electric cooker operation mode.

13 Claims, 5 Drawing Sheets

(51) Int. Cl.
    *A47J 27/12*     (2006.01)
    *A47J 36/24*     (2006.01)

(56) References Cited

U.S. PATENT DOCUMENTS

2017/0064775 A1*   3/2017   Richardson ............ H05B 6/062
2017/0105248 A1*   4/2017   Dolinski ................ H05B 6/062

FOREIGN PATENT DOCUMENTS

| | | |
|---|---|---|
| CN | 202076854 U | 12/2011 |
| CN | 103960956 A | 8/2014 |
| CN | 104427671 A | 3/2015 |
| CN | 204717779 U | 10/2015 |
| CN | 106061336 A | 10/2016 |
| CN | 205849261 U | 1/2017 |
| DE | 102011088675 A1 * | 6/2013 ............ F24C 15/102 |

OTHER PUBLICATIONS

Foshan Shunde Midea Electrical Heating Appliances Manufacturing Co. Ltd., Communication Pursuant to Rules 70(2) and 70a(2), EP17929552.2, dated Nov. 17, 2020, 1 pg.

Foshan Shunde Midea Electrical Heating Appliances Manufacturing Co. Ltd., International Search Report and Written Opinion, PCT/CN2017/111888, dated Jul. 12, 2018, 20 pgs.

Foshan Shunde Midea Electrical Heating Appliances Manufacturing Co. Ltd., Notice of First Review Opinion, CN 201711003976.4, dated Sep. 12, 2019, 11 pgs.

* cited by examiner

SPLIT-TYPE COOKING APPLIANCE AND CONTROL METHOD THEREOF

PRIORITY CLAIM AND RELATED APPLICATIONS

This application is a continuation of PCT Application No. PCT/CN2017/111888, filed Nov. 20, 2017, entitled "SPLIT-TYPE COOKING APPLIANCE AND CONTROL METHOD THEREOF", which claims priority to Chinese Patent Application No. 201711003976.4, filed Oct. 24, 2017, entitled "SPLIT-TYPE COOKING APPLIANCE AND CONTROL METHOD THEREOF", both of which are incorporated herein by reference.

TECHNICAL FIELD

The present disclosure relates to a field of household appliances, and more particularly to a control method for a split-type cooking appliance and a split-type cooking appliance.

BACKGROUND

Small household appliances are widely used in everyday life. A family may have one or more household appliances such as a rice cooker and a pressure cooker. Due to the diversification of products, more products are placed in the home kitchen. In order to reduce an amount of household appliances and reduce the space occupation in the kitchen, household appliances such as the rice cooker and the pressure cooker may be integrated into a split-type cooking appliance.

However, in actual practices, it is difficult for current split-type cooking appliances to accurately and effectively identify a state of the appliance body and the base, and thus it is difficult to accurately control the split-type cooking appliance.

SUMMARY

The present disclosure seeks to solve at least one of the problems that exist in the related art to at least some extent. Accordingly, a first object of the present disclosure is to provide a control method for a split-type cooking appliance, which may effectively identify a separated/combined stage of a base and an appliance body, thus avoiding a safety problem of continuously heating the appliance body in an induction cooker operation mode when an individual identification fails and the combined state is thus cannot be detectable.

A second object of the present disclosure is to provide a split-type cooking appliance.

In order to achieve the above objects, in a first aspect, the present disclosure provides in embodiments a control method for a split-type cooking appliance including: a base provided with an identification module, a coil disk and a wireless transmitting coil circuit module therein, and an appliance body adapted to be placed on the base and detachable from the base. The control method includes: acquiring state information of the identification module after the base is powered on; if the state information of the identification module is a first state, prohibiting the base from operating in an induction cooker operation mode and allowing the base to operate in an electric cooker operation mode; if the state information of the identification module is a second state, determining whether the wireless transmitting coil circuit module detects a feedback signal; if the wireless transmitting coil circuit module detects the feedback signal, prohibiting the base from operating in the induction cooker operation mode and allowing the base to operate in the electric cooker operation mode; and if the wireless transmitting coil circuit module does not detect the feedback signal, allowing the base to operate in the induction cooker operation mode and prohibiting the base from operating in the electric cooker operation mode.

With such a control method of a split-type cooking appliance, after the base is powered on, the state information of the identification module is acquired. When the state information of the identification module is the first state, the base is prohibited from operating in the induction cooker operation mode and allowed to operate in the electric cooker operation mode. When the state information of the identification module is the second state, it is determined whether the wireless transmitting coil circuit module detects the feedback signal. If the wireless transmitting coil circuit module detects the feedback signal, the base is prohibited from operating in the induction cooker operation mode and allowed to operate in the electric cooker operation mode. If the wireless transmitting coil circuit module does not detect the feedback signal, the base is allowed to operate in the induction cooker operation mode and prohibited from operating in the electric cooker operation mode. This method may effectively identify the separated/combined stage of the base and the appliance body, thus avoiding the safety problem of continuously heating the appliance body in the induction cooker operation mode when the individual identification fails and the combined state is thus cannot be detectable.

In addition, the control method of the split-type cooking appliance provided in the above embodiments may further include following additional technical features.

In an embodiment of the present disclosure, the identification module includes a reed switch. The reed switch is on in the first state, and the reed switch is off in the second state.

In an embodiment of the present disclosure, after the base is powered on, when the wireless transmitting coil circuit module is in an off state and the state information of the identification module is the second state, the coil disk is controlled to output a heating and pot-sensing signal, and it is determined according to the heating and pot-sensing signal whether a pot is present on the base. If the pot is present on the base, the wireless transmitting coil circuit module is controlled to operate to determine whether the wireless transmitting coil circuit module detects the feedback signal. If no pot is present on the base, the base is allowed to operate in the induction cooker operation mode, and prohibited from operating in the electric cooker operation mode.

In an embodiment of the present disclosure, the base further includes a first wireless communication module. When the base is prohibited from operating in the induction cooker operation mode and allowed to operate in the electric cooker operation mode, a wireless power supply connection is established between the wireless transmitting coil circuit module and a wireless receiving coil circuit module of the appliance body that is placed on the base, a wireless communication connection is established between the first wireless communication module and a second wireless communication module of the appliance body to perform a communication data interaction between the base and the appliance body that is placed on the base, and the coil disk is controlled to be heated according to the communication data interaction between the base and the appliance body that is placed on the base.

In an embodiment of the present disclosure, when the base is allowed to operate in the induction cooker operation mode and prohibited from operating in the electric cooker operation mode, the coil disk is controlled to be heated in the induction cooker operation mode.

In order to achieve the above objects, in a second aspect, the present disclosure provides in embodiments a split-type cooking appliance including: a base provided with an identification module, a coil disk, a wireless transmitting coil circuit module and an induction cooker control module therein, and an appliance body adapted to be placed on the base and detachable from the base. The induction cooker control module is configured to acquire state information of the identification module after the base is powered on. If the state information of the identification module is a first state, the induction cooker control module is configured to prohibit the base from operating in an induction cooker operation mode and allow the base to operate in an electric cooker operation mode. If the state information of the identification module is a second state, the induction cooker control module is configured to determine whether the wireless transmitting coil circuit module detects a feedback signal. If the wireless transmitting coil circuit module detects the feedback signal, the induction cooker control module is configured to prohibit the base from operating in the induction cooker operation mode and allow the base to operate in the electric cooker operation mode. If the wireless transmitting coil circuit module does not detect the feedback signal, the induction cooker control module is configured to allow the base to operate in the induction cooker operation mode and prohibit the base from operating in the electric cooker operation mode.

With such a split-type cooking appliance according to the embodiments of the present disclosure, the base is provided with the identification module, the coil disk, the wireless transmitting coil circuit module and the induction cooker control module therein. The induction cooker control module is configured to acquire the state information of the identification module after the base is powered on. When the state information of the identification module is the first state, the induction cooker control module is configured to prohibit the base from operating in the induction cooker operation mode and allow the base to operate in the electric cooker operation mode. If the state information of the identification module is the second state, the induction cooker control module is configured to determine whether the wireless transmitting coil circuit module detects the feedback signal. If the wireless transmitting coil circuit module detects the feedback signal, the induction cooker control module is configured to prohibit the base from operating in the induction cooker operation mode and allow the base to operate in the electric cooker operation mode. If the wireless transmitting coil circuit module does not detect the feedback signal, the induction cooker control module is configured to allow the base to operate in the induction cooker operation mode and prohibit the base from operating in the electric cooker operation mode. This split-type cooking appliance may effectively identify the separated/combined stage of the base and the appliance body, thus avoiding the safety problem of continuously heating the appliance body in the induction cooker operation mode when the individual identification fails and the combined state is thus cannot be detectable.

In addition, the split-type cooking appliance provided in the above embodiments may further include following additional technical features.

In an embodiment of the present disclosure, the identification module includes a reed switch. The reed switch is on in the first state, and the reed switch is off in the second state.

In an embodiment of the present disclosure, after the base is powered on, when the wireless transmitting coil circuit module is in an off state and the state information of the identification module is the second state, the induction cooker control module is configured to control the coil disk to output a heating and pot-sensing signal, and to determine whether a pot is present on the base according to the heating and pot-sensing signal. If the pot is present on the base, the induction cooker control module is configured to control the wireless transmitting coil circuit module to operate to determine whether the wireless transmitting coil circuit module detects the feedback signal. If no pot is present on the base, the induction cooker control module is configured to allow the base to operate in the induction cooker operation mode, and prohibit the base from operating in the electric cooker operation mode.

In an embodiment of the present disclosure, the base further includes a first wireless communication module. When the induction cooker control module is configured to prohibit the base from operating in the induction cooker operation mode and allow the base to operate in the electric cooker operation mode, a wireless power supply connection is established between the wireless transmitting coil circuit module and a wireless receiving coil circuit module of the appliance body that is placed on the base, a wireless communication connection is established between the first wireless communication module and a second wireless communication module of the appliance body to perform a communication data interaction between the base and the appliance body that is placed on the base, and an electric cooker control module of the appliance body, that is placed on the base, is configured to control the coil disk to be heated according to the communication data interaction between the base and the appliance body that is placed on the base.

In an embodiment of the present disclosure, when the base is allowed to operate in the induction cooker operation mode and prohibited from operating in the electric cooker operation mode, the induction cooker control module is configured to control the coil disk to be heated in the induction cooker operation mode.

DETAILED DESCRIPTION

Figure 1:
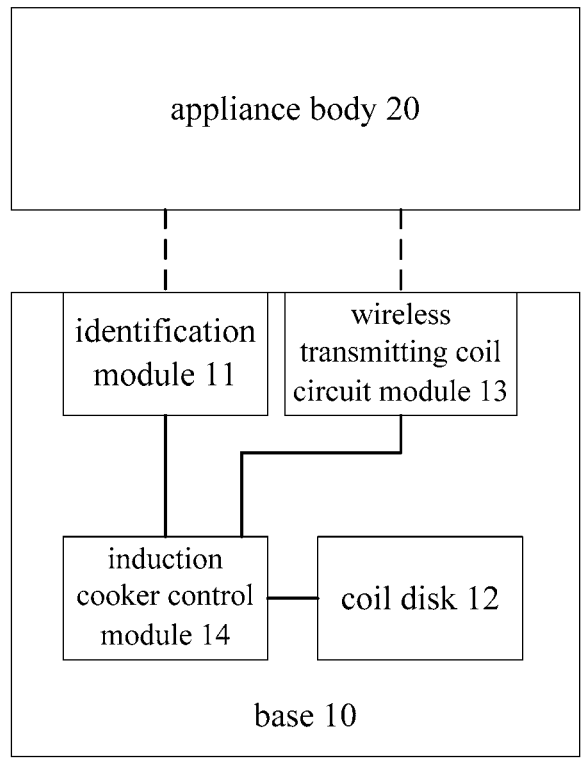
FIG. 1 is a block diagram of a split-type cooking appliance according to an embodiment of the present disclosure.

Embodiments of the present disclosure are described in detail below, examples of which are illustrated in the drawings. The same or similar elements are denoted by same reference numerals in different drawings unless indicated otherwise. The embodiments described herein with reference to drawings are explanatory, and used to generally understand the present disclosure. The embodiments shall not be construed to limit the present disclosure.

A control method for a split-type cooking appliance and a split-type cooking appliance provided in the present disclosure are described below with reference to the drawings. The method can effectively identify a separated/combined state of the base and an appliance body, and can effectively prevent the safety problems where the combined state cannot be detected and the cooking appliance is in the induction cooker operation mode to continuously heat the appliance body in the case where a single identification mode is invalid.

FIG. 1 is a block diagram of a split-type cooking appliance according to an embodiment of the present disclosure. As shown in FIG. 1, the split-type cooking appliance according to embodiments of the present disclosure may include a base 10 and an appliance body 20 adapted to be placed on the base 10 and detachable from the base 10.

In an embodiment of the present disclosure, the base 10 of the split-type cooking appliance may be adapted to support a plurality of different types of appliance bodies 20 respectively. Different cooking appliances may be formed by combining the base 10 and different types of the appliance bodies 20 together. For example, the appliance body 20 may be an ordinary pot, and the base 10 may be used as a heat source to heat the ordinary pot. The appliance body 20 may be an electric pressure cooker body having a pressure device, and may form a split-type electric pressure cooker together with the base 10. The appliance body 20 may be an electric rice cooker body having a rice cooking device, and may form a split-type electric rice cooker together with the base 10. In this way, one base may be used to realize various cooking functions, thus reducing the space occupation in the kitchen.

In an embodiment, the base 10 may be directly connected to the AC mains supply, but the appliance body 20 may not be directly connected to the AC mains supply. When the appliance body 20 is placed on the base 10, the base 10 may provide a power source or a heat source for the appliance body 20. Specifically, the base 10 may include an identification module 11, a coil disk 12, a wireless transmitting coil circuit module 13 and an induction cooker control module 14 therein. When it is determined that the appliance body 20 is placed on the base 10, the induction cooker control module 14 may provide electrical energy to the appliance body 20 through the wireless transmitting coil circuit module 13, and provide thermal energy to the appliance body 20 through the coil disk 12. Since the appliance body 20 may be the ordinary pot, the pressure cooker body or the rice cooker body, and the power required for different appliance bodies 20 is different, it is required to accurately and effectively identify the appliance body 20, to avoid a case where the appliance body 20 is incorrectly detected as the ordinary pot when it is actually the pressure cooker body or the rice cooker body. In this case, the base 10 may continuously heat the pressure cooker body or the rice cooker body, thereby damaging the pressure cooker body or the rice cooker and causing a safety accident.

Figure 2:
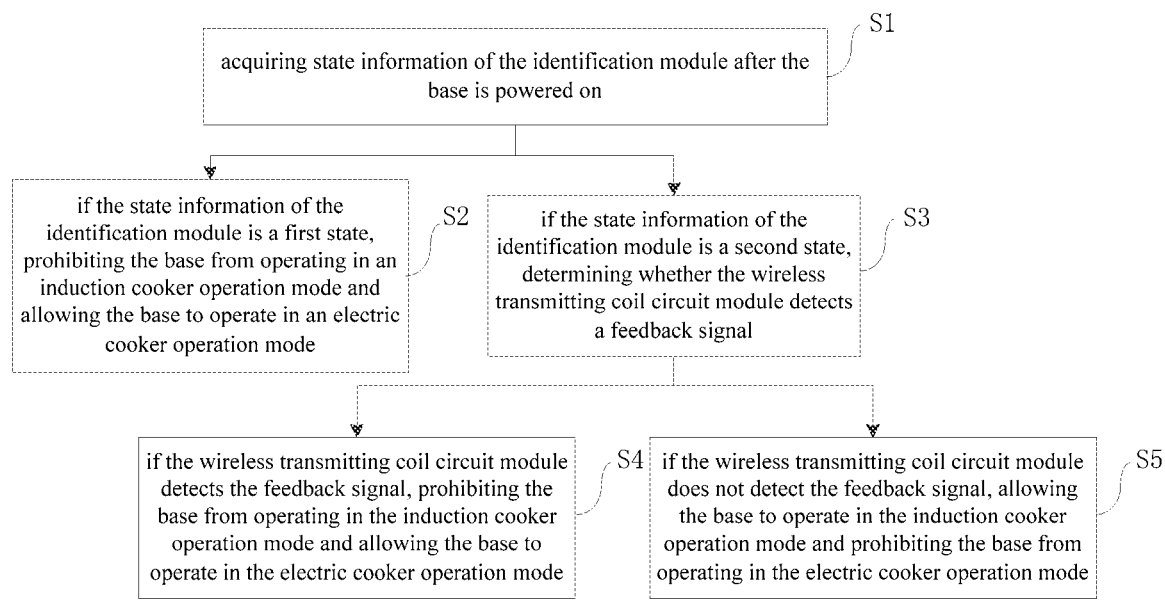
FIG. 2 is a flow chart of a control method for a split-type cooking appliance according to an embodiment of the present disclosure.

FIG. 2 is a flow chart of a control method for a split-type cooking appliance according to an embodiment of the present disclosure. As shown in FIG. 2, the control method for the split-type cooking appliance may include following steps.

In S1, after the base is powered on, state information of the identification module is acquired.

In an embodiment of the preset disclosure, the identification module includes a reed switch. The reed switch is on in the first state, and the reed switch is off in the second state.

Figure 3:
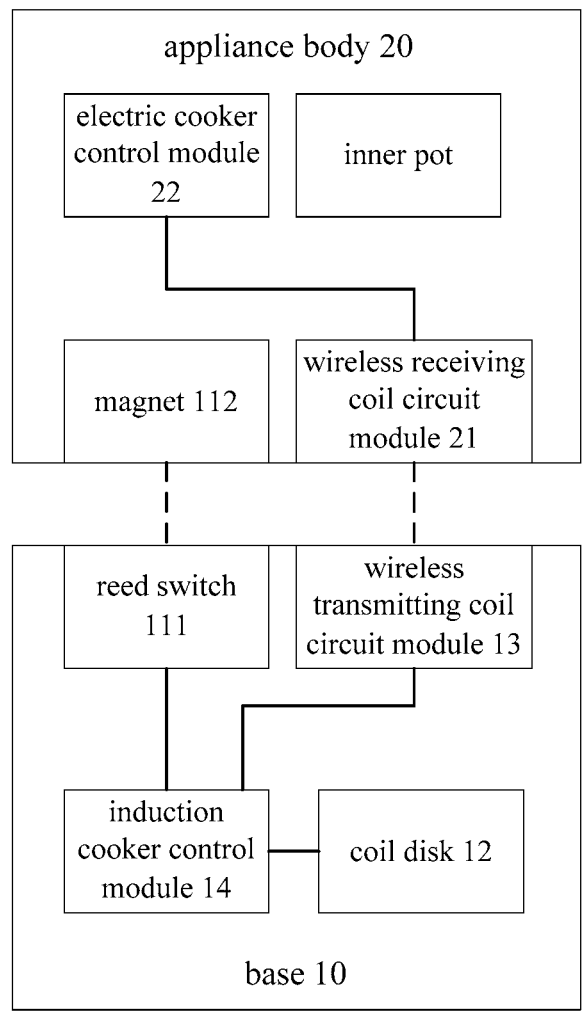
FIG. 3 is a block diagram of a split-type cooking appliance according to another embodiment of the present disclosure.

For example, as shown in FIG. 3, the identification module 11 may include the reed switch 111 and a magnet 112. The reed switch 111 is disposed in the base 10, and the magnet 112 is disposed in the appliance body 20 (such as a pressure cooker body or a rice cooker body). When the appliance body 20 is placed on the base 10, the magnet 112 will get close to the reed switch 111, such that a reed of the reed switch 111 is magnetized, and a contact of the reed will be attracted under the magnetic force. When the attractive force is greater than a spring force of the reed, the contact of the reed switch 111, which is open (disconnected) in a normal condition, will be closed (connected), and the reed switch 111 will be on, indicating that the pressure cooker body or the rice cooker body is placed on the base 10. When the appliance body 20 is not placed on the base 10, the reed switch 111 will be in a disconnected state, indicating that the pressure cooker body and the rice cooker body are not placed on the base 10. In addition, the ordinary pot is not provided with the magnet 112, even if the ordinary pot is placed on the base 10, the reed switch 111 will still be off. Therefore, when the reed switch 111 is on, the pressure cooker body or the rice cooker body is placed on the base 10, which corresponds to the first state (i.e., the combined state); when the reed switch 111 is off, no appliance body 20 is placed on the base 10 or the ordinary pot is placed on the base 10, which corresponds to the second state (i.e., the separated state).

In S2, if the state information of the identification module is the first state, the base is prohibited from operating in an induction cooker operation mode and allowed to operate in an electric cooker operation mode.

Specifically, since the appliance body in the first state is the pressure cooker body or the rice cooker body, the base is prohibited from operating in the induction cooker operation mode and allowed to operate in the electric cooker operation mode.

In S3, if the state information of the identification module is the second state, it is determined whether the wireless transmitting coil circuit module detects a feedback signal.

Specifically, when the state information of the identification module is the second state, it is determined whether the wireless transmitting coil circuit module in the base detects the feedback signal, to further determine whether the pressure cooker body or the rice cooker body is place on the base.

For example, as shown in FIG. 3, the appliance body is not directly connected to the mains supply, such that a wireless receiving coil circuit module 21 may be arranged in the appliance body 20 (such as the pressure cooker body and the rice cooker body), and electromagnetic coupling is performed through the wireless receiving coil circuit module 21 and the wireless transmitting coil circuit module 13 to receive power. Since wireless power transmission requires that the wireless receiving coil circuit module 21 and the wireless transmitting coil circuit module 13 are matched with each other and in corresponding positions, the wireless transmitting coil circuit module can be further used to determine whether the pressure cooker body or the rice cooker body is present on the base.

In an embodiment, as shown in FIG. 3, when the induction cooker control module 14 detects that the reed switch 111 is disconnected, the wireless transmitting coil circuit module 13 is controlled to work, that is, the AC power is supplied to the wireless transmitting coil circuit module 13, so that the wireless transmitting coil circuit module 13 generates an alternating electromagnetic field, and the wireless receiving coil circuit module 21 generates an induced electromotive force under the action of the alternating electromagnetic field. At this time, the electric cooker control module 22 in the appliance body 20 will obtain electrical energy and send the feedback signal to the wireless receiving coil circuit module 21, and the feedback signal is further transmitted to the wireless transmitting coil circuit module 13 via coupling of the wireless receiving coil circuit module 21. The wireless transmitting coil circuit module 13 detects the feedback signal in real time to determine, according to the feedback signal, whether the pressure cooker body or the rice cooker body is present on the base.

In S4, if the wireless transmitting coil circuit module detects the feedback signal, the base is prohibited from operating in the induction cooker operation mode and allowed to operate in the electric cooker operation mode.

In S5, if the wireless transmitting coil circuit module does not detect the feedback signal, the base is allowed to operate in the induction cooker operation mode and prohibited from operating in the electric cooker operation mode.

In an embodiment, as shown in FIG. 3, if the wireless transmitting coil circuit module 13 detects the feedback signal, it indicates that the pressure cooker body or the rice cooker body is placed on the base 10, and the identification module 11 may fail. At this time, the induction cooker control module 14 prohibits the base from operating in the induction cooker operation mode, and allows the base to operate in the electric cooker operation mode. If the wireless transmitting coil circuit module 13 does not detect the feedback signal, it indicates that neither the pressure cooker body nor the rice cooker body has been detected through the two detections of the identification module 11 and the wireless transmitting coil circuit module 13. At this time, the base is allowed to operate in the induction cooker operation mode, and prohibited from operating in the electric cooker operation mode. That is, only when the pressure cooker body and the rice cooker body are undetected through the identification module and the wireless transmitting coil circuit module, the induction cooker operation mode is allowed, thus avoiding the safety problem of continuously heating the appliance body in the induction cooker operation mode when an individual identification fails and the combined state (the pressure cooker body or the rice cooker body is placed on the base) is thus cannot be detectable.

In an embodiment of the present disclosure, the base further includes a first wireless communication module. When the base is prohibited from operating in the induction cooker operation mode and allowed to operate in the electric cooker operation mode, a wireless power supply connection is established between the wireless transmitting coil circuit module and the wireless receiving coil circuit module of the appliance body that is placed on the base, a wireless communication connection is established between the first wireless communication module and the second wireless communication module of the appliance body to perform a communication data interaction between the base and the appliance body that is placed on the base, and the coil disk is controlled to be heated according to the communication data interaction between the base and the appliance body that is placed on the base.

Figure 4:
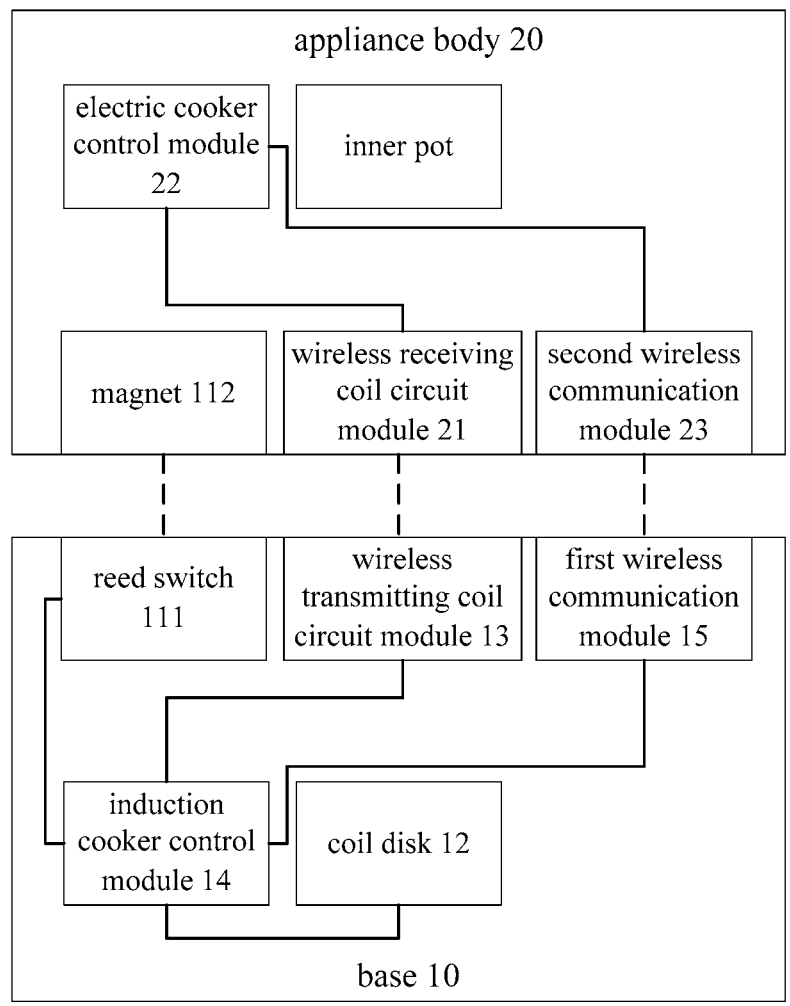
FIG. 4 is a block diagram of a split-type cooking appliance according to a further embodiment of the present disclosure.

In an embodiment, as shown in FIG. 4, the base 10 is provided with the first communication module 15, and the appliance body 20 (such as the pressure cooker body or the rice cooker body) is provided with the second communication module 23. The first communication module 15 and the second communication module 23 may be an infrared communication module.

When the induction cooker control module 14 determines that the appliance body 20 is the pressure cooker body or the rice cooker body via the identification module 11 and the wireless transmitting coil circuit module 13, the induction cooker control module 14 may prohibit the base from operating in the induction cooker operation mode and allow the base to operate in the electric cooker operation mode. At this time, the induction cooker control module 14 applies an alternating current to the wireless transmitting coil circuit module 13, such that the wireless transmitting coil circuit module 13 generates the alternating electromagnetic field, and the wireless receiving coil circuit module 21 generates the induced electromotive force under the action of the alternating electromagnetic field, to supply power to the electric cooker control module 22 in the appliance body 20. Then, the electric cooker control module 22 controls the second wireless communication module 23 and the first wireless communication module 15 to establish the wireless communication connection to transmit relevant heating data information to the induction cooker control module 14, such that the induction cooker control module 14 may heat and control the coil disk 12, e.g., to control the coil disk to induce heating a pot of the appliance body 20, according to the received relevant heating data information.

In an embodiment of the present disclosure, when the base is allowed to operate in the induction cooker operation mode and prohibited from operating in the electric cooker operation mode, the coil disk is controlled to be heated in the induction cooker operation mode.

In an embodiment, as shown in FIG. 4, when the induction cooker control module 14 determines that there is no appliance body 20 or the appliance body 20 is the ordinary pot via the identification module 11 and the wireless transmitting coil circuit module 13, the induction cooker control module 14 may allow the base to operate in the induction cooker operation mode and prohibit the base from operating in the electric cooker operation mode. At this time, the coil disk 12 is controlled to be heated in the induction cooker operation mode. It should be noted that when the coil disk 12 is controlled to be heated in the induction cooker operation mode (such as heating via the resonant induction), it is first detected whether the ordinary pot is present on the base. If the ordinary pot exists, the heating is performed; otherwise, the heating is prohibited.

Figure 5:
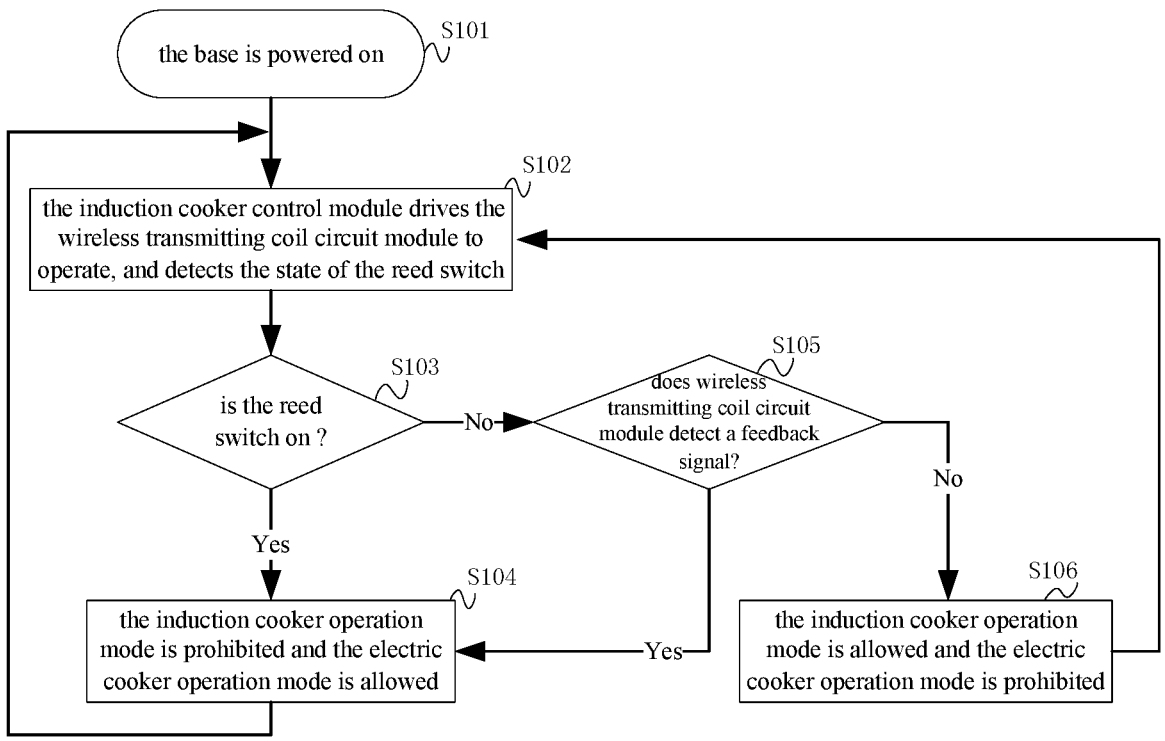
FIG. 5 is a flow chart of a control method for a split-type cooking appliance according to an embodiment of the present disclosure.

FIG. 5 is a flow chart of a control method for a split-type cooking appliance according to an embodiment of the present disclosure. As shown in FIG. 5, the control method for the split-type cooking appliance may include following steps.

In S101, the base is powered on.

In S102, the induction cooker control module drives the wireless transmitting coil circuit module to operate, and detects the state of the reed switch.

In S103, it is determined whether the reed switch is on. If yes, S104 is performed. If no, S105 is performed.

In S104, the induction cooker operation mode is prohibited and the electric cooker operation mode is allowed.

In S105: it is determined whether the wireless transmitting coil circuit module detects a feedback signal. If yes, S104 is performed. If no, S106 is performed.

In S106, the induction cooker operation mode is allowed and the electric cooker operation mode is prohibited.

Therefore, with the control method of the split-type cooking appliance according to the embodiments of the present disclosure, signal coupling is realized in two manners of the identification module and the wireless transmitting coil circuit module, to detect the separated and combined state of the appliance body and the base, and further to determine a correct operation mode, thus avoiding the safety problem of continuously heating the appliance body in the induction cooker operation mode when the individual identification fails and the combined state is thus cannot be detectable. Further, when the induction cooker operating mode is prohibited and the electric cooker operation mode is allowed, the signal coupling is established between the first wireless communication module and the second wireless communication module, such that the separation and the combination of the appliance body and the base may also be detected by the first wireless communication module and the second wireless communication module. In other words, the detection may be realized in three manners at the same time, thus greatly improving the reliability of the detection and ensuring the safety of the operation of the split-type cooking appliance.

Further, in an embodiment of the present disclosure, after the base is powered on, when the wireless transmitting coil circuit module is in an off state and the state information of the identification module is the second state, the coil disk is controlled to output a heating and pot-sensing signal, and it is determined according to the heating and pot-sensing signal whether a pot is present on the base. If the pot is present on the base, the wireless transmitting coil circuit module is controlled to operate to determine whether the wireless transmitting coil circuit module detects the feedback signal. If no pot is present on the base, the base is allowed to operate in the induction cooker operation mode, and prohibited from operating in the electric cooker operation mode.

In an embodiment, as shown in FIG. 4, when the induction cooker control module 14 detects that the reed switch 111 is disconnected, generally speaking, there are two possibilities. One of the possibilities is that the appliance body 20 is the ordinary pot, and the other one is that there is no appliance body 20 on the base 10. On this basis, the coil disk 12 may be controlled to output the heating and pot-sensing signal to determine whether the pot is present on the base 10. If the pot exists, the wireless transmitting coil circuit module 13 is controlled to operate, that is, to supply an alternating current to the wireless transmitting coil circuit module 13, such that the wireless transmitting coil circuit module 13 generates the alternating electromagnetic field, and the wireless receiving coil circuit module 21 generates the induced electromotive force under the action of the alternating electromagnetic field. At this time, the electric cooker control module 22 in the appliance body 20 may obtain the electric power and send the feedback signal to the wireless receiving coil circuit module 21, and the feedback signal is further transmitted to the wireless transmitting coil circuit module 13 via coupling of the wireless receiving coil circuit module 21. The wireless transmitting coil circuit module 13 detects the feedback signal in real time, and the induction cooker control module 14 determines, according to the feedback signal, whether the pressure cooker body or the rice cooker body is present on the base. If there is no pot on the base 10, the base 10 is allowed to operate in the induction cooker operation mode and prohibited from operating in the electric cooker operation mode.

In other words, before the wireless transmitting coil circuit module is used to further determine whether the appliance body is the pressure cooker body or the rice cooker body, it is first determined whether a pot is present on the base. If the pot exists, the wireless transmitting coil circuit module is used to determine whether the appliance is the pressure cooker body or the rice cooker body, thus effectively avoiding the problem of high power consumption caused by the wireless detection of the split-type cooking appliance in a standby mode.

Figure 6:
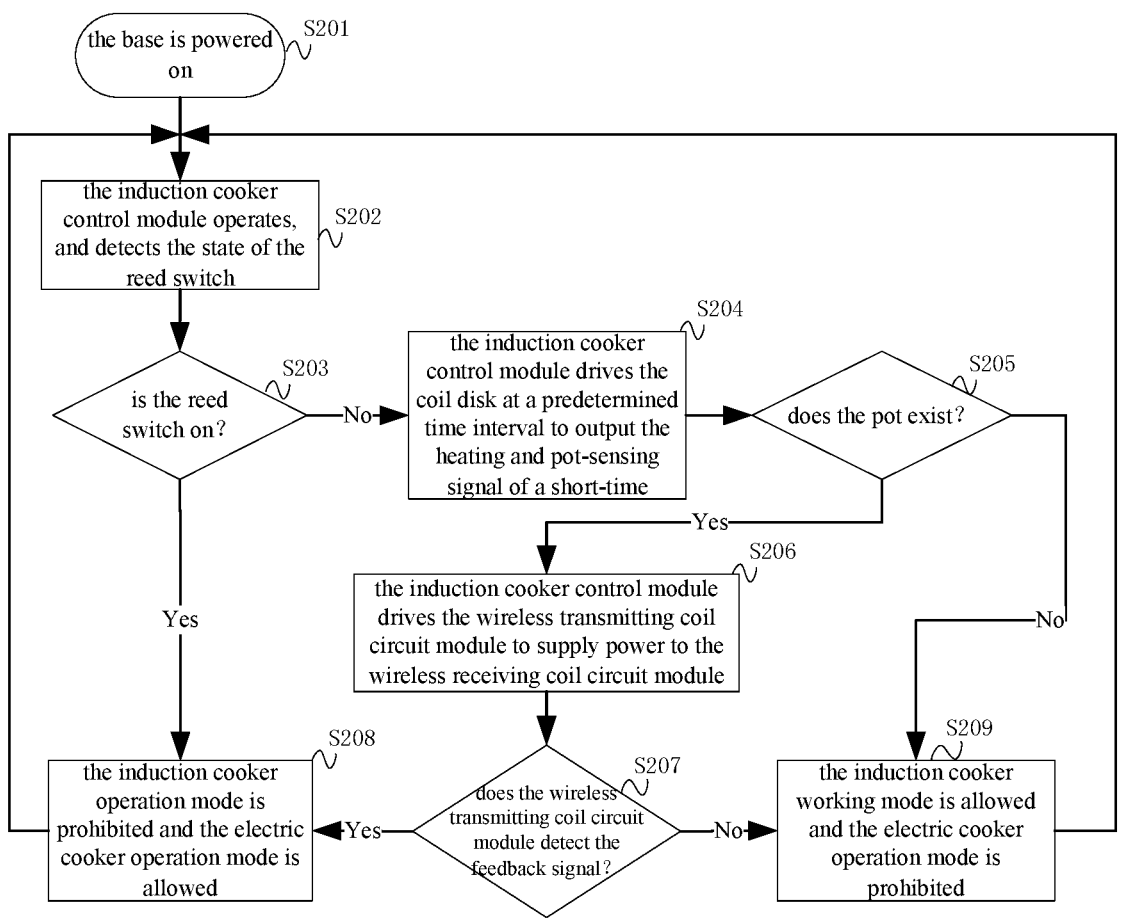
FIG. 6 is a flow chart of a control method for a split-type cooking appliance according to an embodiment of the present disclosure.

Further, FIG. 6 is a flow chart of a control method for a split-type cooking appliance according to an embodiment of the present disclosure. As shown in FIG. 6, the control method for the split-type cooking appliance may include following steps.

In S201, the base is powered on.

In S202, the induction cooker control module operates, and detects the state of the reed switch.

In S203, it is determined whether the reed switch is on. If yes, S208 is performed. If no, S204 is performed.

In 204, the induction cooker control module drives the coil disk at a predetermined time interval (such as 10 s to 1 min) to output the heating and pot-sensing signal of a short-time (such as 1 to 2 s).

In S205, it is determined whether the pot exists. If yes, S206 is performed; if no, S209 is performed.

In S206, the induction cooker control module drives the wireless transmitting coil circuit module to supply power to the wireless receiving coil circuit module.

In S207, it is determined whether the wireless transmitting coil circuit module detects the feedback signal. If yes, S208 is performed; if no, S209 is performed.

In S208, the induction cooker operation mode is prohibited and the electric cooker operation mode is allowed.

In S209, the induction cooker working mode is allowed and the electric cooker operation mode is prohibited.

In conclusion, with such a control method of a split-type cooking appliance, after the base is powered on, the state information of the identification module is acquired. When the state information of the identification module is the first state, the base is prohibited from operating in the induction cooker operation mode and allowed to operate in the electric cooker operation mode. When the state information of the identification module is the second state, it is determined whether the wireless transmitting coil circuit module detects the feedback signal. If the wireless transmitting coil circuit module detects the feedback signal, the base is prohibited from operating in the induction cooker operation mode and allowed to operate in the electric cooker operation mode. If the wireless transmitting coil circuit module does not detect the feedback signal, the base is allowed to operate in the induction cooker operation mode and prohibited from operating in the electric cooker operation mode. This method may effectively identify a separated/combined stage of the base and the appliance body, thus avoiding the safety problem of continuously heating the appliance body in the induction cooker operation mode when an individual identification fails and the combined state is thus cannot be detectable.

The split-type cooking appliance according to embodiments of the present disclosure is described in detail as follows.

As shown in FIG. 1, the split-type cooking appliance according to an embodiment of the present disclosure may include a base 10 and an appliance body 20. The appliance body 20 is adapted to be placed on the base 10 and detachable from the base 10. The base 10 is provided with an identification module 11, a coil disk 12, a wireless transmitting coil circuit module 13 and an induction cooker control module 14 therein. The induction cooker control module 14 is configured to acquire state information of the identification module after the base 10 is powered on. If the state information of the identification module 11 is a first state, the induction cooker control module 14 is configured to prohibit the base 10 from operating in an induction cooker operation mode and allow the base 10 to operate in an electric cooker operation mode. If the state information of the identification module 11 is a second state, the induction cooker control module 14 is configured to determine whether the wireless transmitting coil circuit module 13 detects a feedback signal. If the wireless transmitting coil circuit module 13 detects the feedback signal, the induction cooker control module 14 is configured to prohibit the base 10 from operating in the induction cooker operation mode and allow the base 10 to operate in the electric cooker operation mode. If the wireless transmitting coil circuit module 13 does not detect the feedback signal, the induction cooker control module 14 is configured to allow the base 10 to operate in the induction cooker operation mode and prohibit the base 10 from operating in the electric cooker operation mode.

In an embodiment of the present disclosure, as shown in FIG. 3, the identification module 11 includes a reed switch 111. The reed switch 111 is on in the first state, and the reed switch 111 is off in the second state.

In an embodiment of the present disclosure, after the base 10 is powered on, when the wireless transmitting coil circuit module 13 is in an off state and the state information of the identification module 11 is the second state, the induction cooker control module 14 is configured to control the coil disk 12 to output a heating and pot-sensing signal, and to determine whether a pot is present on the base 10 according to the heating and pot-sensing signal. If the pot is present on the base 10, the induction cooker control module 14 is configured to control the wireless transmitting coil circuit module 13 to operate to determine whether the wireless transmitting coil circuit module 13 detects the feedback signal. If no pot is present on the base 10, the induction cooker control module 14 is configured to allow the base 10 to operate in the induction cooker operation mode, and prohibit the base 10 from operating in the electric cooker operation mode.

In an embodiment of the present disclosure, as shown in FIG. 4, the base 10 further includes a first wireless communication module 15. When the induction cooker control module 14 is configured to prohibit the base 10 from operating in the induction cooker operation mode and allow the base 10 to operate in the electric cooker operation mode, a wireless power supply connection is established between the wireless transmitting coil circuit module 13 and a wireless receiving coil circuit module 21 of the appliance body 20 that is placed on the base 10, a wireless communication connection is established between the first wireless communication module 15 and a second wireless communication module 23 of the appliance body 20 to perform a communication data interaction between the base 10 and the appliance body 20 that is placed on the base 10, and an electric cooker control module 22 of the appliance body 20, that is placed on the base 10, is configured to control the coil disk 12 to be heated according to the communication data interaction between the base 10 and the appliance body 20 that is placed on the base 10.

In an embodiment of the present disclosure, when the base 10 is allowed to operate in the induction cooker operation mode and prohibited from operating in the electric cooker operation mode, the induction cooker control module 14 is configured to control the coil disk 12 to be heated in the induction cooker operation mode.

It should be noted that details not disclosed in the embodiments of the split-type cooking appliance of the present disclosure may refer to the details disclosed in the embodiments of the control method for the split-type cooking appliance of the present disclosure, which will not be elaborated in detail herein.

With such a split-type cooking appliance according to the embodiments of the present disclosure, the base of the cooking appliance is provided with the identification module, the coil disk, the wireless transmitting coil circuit module and the induction cooker control module therein. The induction cooker control module is configured to acquire state information of the identification module after the base is powered on. When the state information of the identification module is the first state, the induction cooker control module is configured to prohibit the base from operating in the induction cooker operation mode and allow the base to operate in the electric cooker operation mode. If the state information of the identification module is the second state, the induction cooker control module is configured to determine whether the wireless transmitting coil circuit module detects the feedback signal. If the wireless transmitting coil circuit module detects the feedback signal, the induction cooker control module is configured to prohibit the base from operating in the induction cooker operation mode and allow the base to operate in the electric cooker operation mode. If the wireless transmitting coil circuit module does not detect the feedback signal, the induction cooker control module is configured to allow the base to operate in the induction cooker operation mode and prohibit the base from operating in the electric cooker operation mode. This split-type cooking appliance may effectively identify a separated/combined stage of the base and the appliance body, thus avoiding the safety problem of continuously heating the appliance body in the induction cooker operation mode when an individual identification fails and the combined state is thus cannot be detectable.

In the specification, it is to be understood that terms such as "central", "longitudinal", "lateral", "length", "width", "thickness", "upper", "lower", "front", "rear", "left", "right", "vertical", "horizontal", "top", "bottom", "inner", "outer", "clockwise", "counterclockwise", "axial", "radial" and "circumferential" should be construed to refer to the orientation as then described or as shown in the drawings under discussion. These relative terms are for convenience of description and do not require that the present disclosure be constructed or operated in a particular orientation, and thus shall not be construed to limit the present disclosure.

In addition, terms such as "first" and "second" are used herein for purposes of description and are not intended to indicate or imply relative importance or significance or to imply the number of indicated technical features. Thus, the feature defined with "first" and "second" may include one or more of this feature. In the description of the present disclosure, unless specified otherwise, "a plurality of" means two or more than two.

In the present disclosure, unless specified or limited otherwise, the terms "mounted", "connected", "coupled", "fixed" and the like are used broadly, and may be, for example, fixed connections, detachable connections, or integral connections; may also be mechanical or electrical connections; may also be direct connections or indirect connections via intervening structures; may also be inner communications of two elements, which can be understood by those skilled in the art according to specific situations.

In the description, unless specified or limited otherwise, a structure in which a first feature is "on" or "below" a second feature may include an embodiment in which the first feature is in direct contact with the second feature, and may also include an embodiment in which the first feature and the second feature are not in direct contact with each other, but are contacted via an additional feature formed therebetween. Furthermore, a first feature "on", "above" or "on top of" a second feature may include an embodiment in which the first feature is right or obliquely "on", "above" or "on top of" the second feature, or just means that the first feature is at a height higher than that of the second feature; while a first feature "below", "under" or "on bottom of" a second feature may include an embodiment in which the first feature is right or obliquely "below", "under" or "on bottom of" the second feature, or just means that the first feature is at a height lower than that of the second feature.

Reference throughout this specification to "an embodiment", "some embodiments", "an example", "a specific example", or "some examples" means that a particular feature, structure, material, or characteristic described in connection with the embodiment or example is included in at least one embodiment or example of the present disclosure. Thus, the appearances of above phrases in various places throughout this specification are not necessarily referring to the same embodiment or example of the present disclosure. Furthermore, the particular features, structures, materials, or characteristics may be combined in any suitable manner in one or more embodiments or examples. In addition, different embodiments or examples described in the specification, as well as features of embodiments or examples, without conflicting, may be combined by one skilled in the art.

Although explanatory embodiments have been shown and described, it would be appreciated by those skilled in the art that the above embodiments cannot be construed to limit the present disclosure, and changes, alternatives, and modifications can be made in the embodiments without departing from spirit, principles and scope of the present disclosure.

What is claimed is:

1. A control method, comprising:
at a split-type cooking appliance that has a base provided with an identification device, a coil disk and a wireless transmitting coil circuit therein, wherein an appliance body is adapted to be placed on the base and detachable from the base:
  acquiring state information of the identification device after the base is powered on;
  in accordance with a determination that the state information of the identification device is a first state, the control method causes an induction cooker control module to prohibit the base from operating in an induction cooker operation mode and allowing the base to operate in an electric cooker operation mode by supplying AC power to the wireless transmitting coil circuit to generate an alternating electromagnetic field;
  in accordance with a determination that the state information of the identification device is a second state different from the first state, the control method causes the induction cooker control module to determine whether the wireless transmitting coil circuit detects a feedback signal generated by an electric cooker control module from an induced electromotive force caused by the alternating electromagnetic field;
  in accordance with a determination that the wireless transmitting coil circuit detects the feedback signal, the control method causes the induction cooker control module to prohibit the base from operating in the induction cooker operation mode and to allow the base to operate in the electric cooker operation mode by supplying AC power to the wireless transmitting coil circuit to generate the alternating electromagnetic field; and
  in accordance with a determination that the wireless transmitting coil circuit does not detect the feedback signal, the control method causes the induction cooker control module to allow the base to operate in the induction cooker operation mode and to prohibit the base from operating in the electric cooker operation mode.

2. The control method according to claim 1, wherein the identification device comprises a reed switch, wherein the reed switch is on in the first state, and the reed switch is off in the second state.

3. The control method according to claim 1, wherein after the base is powered on, when the wireless transmitting coil circuit is in an off state and the state information of the identification device is the second state, the coil disk is controlled to output a heating and pot-sensing signal, and it is determined according to the heating and pot-sensing signal whether a pot is present on the base, wherein
  if the pot is present on the base, the wireless transmitting coil circuit is controlled to operate to determine whether the wireless transmitting coil circuit detects the feedback signal; and
  if no pot is present on the base, the base is allowed to operate in the induction cooker operation mode, and prohibited from operating in the electric cooker operation mode.

4. The control method according to claim 1, wherein the base further comprises a first wireless communication device, wherein:
  when the base is prohibited from operating in the induction cooker operation mode and allowed to operate in the electric cooker operation mode, a wireless power supply connection is established between the wireless transmitting coil circuit and a wireless receiving coil circuit of the appliance body that is placed on the base, a wireless communication connection is established between the first wireless communication device and a second wireless communication device of the appliance body to perform a communication data interaction between the base and the appliance body that is placed on the base, wherein the first wireless communication device and the second wireless communication device comprise infrared communication modules, and the coil disk is controlled to be heated according to the communication data interaction between the base and the appliance body that is placed on the base.

5. The control method according to claim 1, wherein when the base is allowed to operate in the induction cooker operation mode and prohibited from operating in the electric cooker operation mode, the coil disk is controlled to be heated in the induction cooker operation mode.

6. The control method of claim 1, wherein the electric cooker control module is provided in an appliance body, and the feedback signal is sent from the electric cooker control module to a wireless receiving coil circuit in the appliance body.

7. The control method of claim 6, wherein the wireless receiving coil circuit transmits the feedback signal to the wireless transmitting coil circuit.

8. The method of claim 1, wherein the electric cooker operation mode is used when the appliance body comprises a pressure cooker body or a rice cooker body.

9. A split-type cooking appliance, comprising:
  a base provided with an identification device, a coil disk, a wireless transmitting coil circuit and an induction cooker control device therein, and
  an appliance body adapted to be placed on the base and detachable from the base,
  wherein the induction cooker control device is configured to acquire state information of the identification device after the base is powered on, wherein
  in accordance with a determination that the state information of the identification device is a first state, the induction cooker control device is configured to prohibit the base from operating in an induction cooker operation mode and allow the base to operate in an electric cooker operation mode by supplying AC power to the wireless transmitting coil circuit to generate an alternating electromagnetic field;
  in accordance with a determination that the state information of the identification device is a second state, the induction cooker control device is configured to determine whether the wireless transmitting coil circuit detects a feedback signal generated by an electric cooker control module from an induced electromotive force caused by the alternating electromagnetic field;
  in accordance with a determination that the wireless transmitting coil circuit detects the feedback signal, the induction cooker control device is configured to prohibit the base from operating in the induction cooker operation mode and allow the base to operate in the electric cooker operation mode by supplying AC power to the wireless transmitting coil circuit to generate the alternating electromagnetic field; and
  in accordance with a determination that the wireless transmitting coil circuit does not detect the feedback signal, the induction cooker control device is configured to allow the base to operate in the induction cooker operation mode and prohibit the base from operating in the electric cooker operation mode.

10. The split-type cooking appliance according to claim 9, wherein the identification device comprises a reed switch, wherein the reed switch is on in the first state, and the reed switch is off in the second state.

11. The split-type cooking appliance according to claim 9, wherein after the base is powered on, when the wireless transmitting coil circuit is in an off state and the state information of the identification device is the second state, the induction cooker control device is configured to control the coil disk to output a heating and pot-sensing signal, and to determine whether a pot is present on the base according to the heating and pot-sensing signal, wherein
  if the pot is present on the base, the induction cooker control device is configured to control the wireless transmitting coil circuit to operate to determine whether the wireless transmitting coil circuit detects the feedback signal; and
  if no pot is present on the base, the induction cooker control device is configured to allow the base to operate in the induction cooker operation mode, and prohibit the base from operating in the electric cooker operation mode.

12. The split-type cooking appliance according to claim 9, wherein the base further comprises a first wireless communication device, wherein:
  when the induction cooker control device is configured to prohibit the base from operating in the induction cooker operation mode and allow the base to operate in the electric cooker operation mode, a wireless power supply connection is established between the wireless transmitting coil circuit and a wireless receiving coil circuit of the appliance body that is placed on the base, a wireless communication connection is established between the first wireless communication device and a second wireless communication device of the appliance body to perform a communication data interaction between the base and the appliance body that is placed on the base, wherein the first wireless communication device and the second wireless communication device comprise infrared communication modules, and an electric cooker control device of the appliance body, that is placed on the base, is configured to control the coil disk to be heated according to the communication data interaction between the base and the appliance body that is placed on the base.

13. The split-type cooking appliance according to claim 9, wherein when the base is allowed to operate in the induction cooker operation mode and prohibited from operating in the electric cooker operation mode, the induction cooker control module is configured to control the coil disk to be heated in the induction cooker operation mode.

\* \* \* \* \*